(12) United States Patent
Watanabe et al.

(10) Patent No.: US 7,432,948 B2
(45) Date of Patent: Oct. 7, 2008

(54) IMAGING COMMUNICATION SYSTEM

(75) Inventors: Mikio Watanabe, Asaka (JP); Yukihiro Kawada, Asaka (JP)

(73) Assignee: Fuji Film Corporation, Tokyo (JP)

( * ) Notice: Subject to any disclaimer, the term of this patent is extended or adjusted under 35 U.S.C. 154(b) by 862 days.

(21) Appl. No.: 10/383,766

(22) Filed: Mar. 10, 2003

(65) Prior Publication Data
US 2004/0204083 A1 Oct. 14, 2004

(30) Foreign Application Priority Data
Mar. 11, 2002 (JP) .............................. 2002-065166

(51) Int. Cl.
H04N 7/14 (2006.01)

(52) U.S. Cl. .............. 348/14.02; 348/211.1; 348/207.1; 348/207.11; 348/231.6; 348/220.1; 455/556.1; 455/566

(58) Field of Classification Search .............. 348/14.02, 348/14.01, 207.1, 207.11, 207.2, 208.99, 348/222.1, 231.6, 333.11, 231.99, 211.1, 348/14.12, 14.13, 220.1; 358/302, 405, 426.01, 358/426.03, 126.06, 448, 452; 455/556.1, 455/145, 557, 66.1, 566; 725/165; 382/232
See application file for complete search history.

(56) References Cited

U.S. PATENT DOCUMENTS

| 6,433,818 | B1 * | 8/2002 | Steinberg et al. ............. 348/161 |
| 6,522,889 | B1 * | 2/2003 | Aarnio ..................... 455/456.5 |
| 6,670,982 | B2 * | 12/2003 | Clough et al. ............. 348/14.02 |
| 6,821,034 | B2 * | 11/2004 | Ohmura ........................ 400/76 |
| 6,950,126 | B1 * | 9/2005 | Homma et al. ......... 348/211.99 |
| 7,034,880 | B1 * | 4/2006 | Endsley et al. ......... 348/333.11 |
| 2002/0032909 | A1 * | 3/2002 | Shiota et al. .................. 725/91 |
| 2002/0079864 | A1 * | 6/2002 | Soumi et al. ................ 320/115 |
| 2002/0101619 | A1 * | 8/2002 | Tsubaki et al. .............. 358/302 |
| 2003/0064685 | A1 * | 4/2003 | Kim ............................ 455/90 |
| 2004/0090527 | A1 * | 5/2004 | Kanevsky et al. ......... 348/207.1 |
| 2005/0207487 | A1 * | 9/2005 | Monroe ................. 375/240.01 |

FOREIGN PATENT DOCUMENTS

JP 2001-045390 * 2/2001

* cited by examiner

*Primary Examiner*—Matthew Anderson
*Assistant Examiner*—Dominic E Rego
(74) *Attorney, Agent, or Firm*—McGinn IP Law Group, PLLC

(57) ABSTRACT

A digital camera connects to a cradle through a signal line. In a first mode, the digital camera in combination with a personal computer forms a transmission path through a USB interface to allow for communication. In a second mode, the digital camera performs an intervening function for communication between a mobile telephone and the personal computer through a short-distance wireless communication interface and the USB interface. In the first mode, image and other data stored in a memory card of the digital camera can be transmitted to the personal computer and image and other data from the personal computer can be transmitted to the digital camera. In the second mode, the digital camera acts as a transmitter-receiver terminal for communication between the personal computer and the mobile telephone. According to this imaging communication system, since the imaging apparatus also serves as a communication adapter, a host communication unit can communicate with any terminal unit other than the imaging apparatus in a wireless manner, with the imaging apparatus connected to the host communication unit for communication.

23 Claims, 7 Drawing Sheets

IMAGING COMMUNICATION SYSTEM

BACKGROUND OF THE INVENTION

1. Field of the Invention

The present invention relates to an imaging communication system which has an imaging function and is capable of communicating with a communication terminal such as a mobile telephone and a personal digital assistance (PDA) as well as a host communication unit such as a personal computer.

2. Description of the Related Art

Japanese Patent Application Publication No. 2001-45390 discloses technique for connecting a display unit such as a monitor to an image processing unit such as a video recorder as well as to other communication units. This technique allows a coupling apparatus to intervene between the display unit and the image processing unit for wireless transmission to and/or from a communication unit. However, it is inconvenient that the technique cannot be applied to the case where the image processing unit singly performs wireless transmission to the communication unit without such a coupling apparatus. Moreover, with an imaging apparatus such as a digital camera connected to a host communication unit for communication therewith, the digital camera provided with an additional communication connection device cannot use the additional communication connection device.

SUMMARY OF THE INVENTION

In view of the above circumstances, it is an object of the present invention to provide an imaging communication system which allows an imaging apparatus provided with an additional communication connection device to use the additional communication connection device without any coupling apparatus independent of the imaging apparatus, with the imaging apparatus connected to a host communication unit for communication therewith.

In order to attain the above-described object, the present invention is directed to an imaging communication system which is adapted to communicate with a communication terminal and a host communication unit, the system comprising: an imaging apparatus having an imaging device, an image processing device, a memory device, and a first communication device which allows communication with the communication terminal; and a support apparatus which is capable of being connected to a power supply to provide electric power from the connected power supply for the imaging apparatus and which has a second communication device for the host communication unit connected to the imaging apparatus through a signal line to allow communication between the imaging apparatus and the host communication unit, wherein the imaging communication system is capable of selectively operating in each of the following modes: a first mode in which the imaging apparatus is capable of communicating with the host communication unit through the support apparatus; and a second mode in which the imaging apparatus is capable of acting as a communication intervening unit between the communication terminal and the host communication unit through the first communication device and the support apparatus.

According to the present invention, the imaging apparatus connects to the support apparatus through the signal line. The imaging apparatus includes, for example, a digital camera. The support apparatus includes, for example, an imaging apparatus adapter or cradle which also serves to charge the imaging apparatus. In the first mode, the imaging apparatus forms a transmission path through the host communication unit and the second communication device. In the second mode, the imaging apparatus performs an intervening function for communication between the communication terminal and the host communication unit through the first communication device and the second communication device. Therefore, in the first mode, image and other data stored in the memory device of the imaging apparatus can be transmitted to the host communication unit and image and other data from the host unit can be transmitted to the imaging apparatus. In the second mode, the imaging apparatus acts as a transmitter-receiver terminal for communication between the host communication unit and the communication terminal. The present imaging communication system can select either of the first mode and the second mode.

When the second mode is selected, the imaging apparatus may stop the imaging function and the image processing function.

Preferably, when the first mode is selected, the imaging apparatus is capable of transmitting a communication ID of the imaging apparatus and contents recorded on a memory medium connected to the imaging apparatus, to the host communication unit; and when the second mode is selected, the imaging apparatus and the support apparatus relay data transmitted between the first communication device and the communication terminal and data transmitted between the second communication device and the host communication unit.

According to the present invention, in the first mode, the imaging apparatus can transmit, voluntarily or upon receipt of a call from the host communication unit, a communication ID of the imaging apparatus and contents recorded on a memory medium connected to the imaging apparatus, to the host communication unit. In the second mode, the imaging apparatus and support apparatus relay data transmitted between the first communication device and the communication terminal and data transmitted between the second communication device and the host communication unit.

Preferably, when the second mode is selected, a transmission path formed between the first communication device and the communication terminal is wireless, and a transmission path formed between the second communication device and the host communication unit is wired.

According to the present invention, when the second mode is selected, communication between the first communication device and the communication terminal takes place in a wireless manner and communication between the second communication device and the host communication unit, that is, between the imaging apparatus and the host communication unit takes place in a wired manner.

Preferably, the imaging apparatus comprises: a connecting terminal for connecting to the support apparatus through a signal line; and an antenna element for communicating with the communication terminal, the antenna element being arranged on a face different from a face on which the connecting terminal is arranged.

According to the present invention, the transmission/reception sensitivity for wireless communication is improved.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

An embodiment of the present invention will be described below in detail with reference to the attached drawings.

Figure 1:
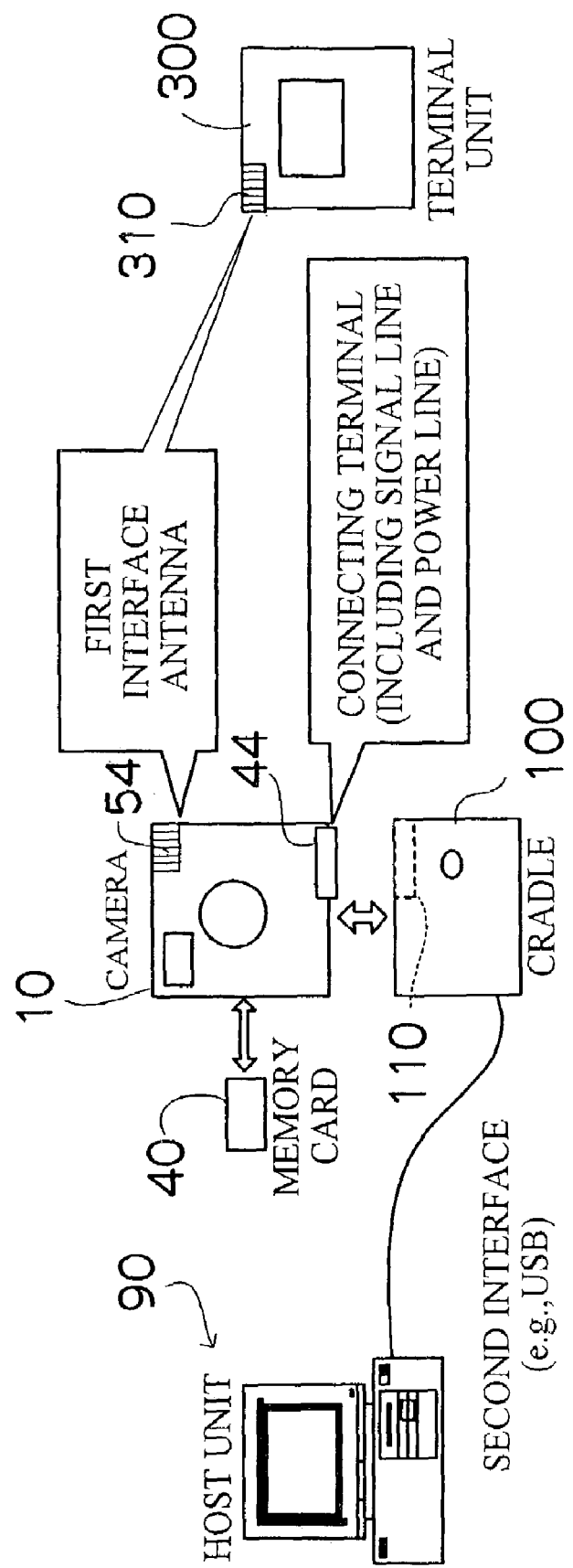
FIG. 1 is a schematic view for showing how the imaging system according to an embodiment is connected to the host communication unit, more specifically, a personal computer, and the communication terminal, more specifically, a mobile telephone.

FIG. 1 is a schematic view for showing how an imaging system according to the embodiment is connected to a host communication unit or a personal computer 90, and the communication terminal or a mobile telephone 300. The imaging system comprises the imaging apparatus or a digital camera 10, and a cradle 100 for supporting the digital camera 10. The digital camera 10 is connected to the cradle 100 through a connector described later. The cradle 100 is connected to the personal computer 90 in a wired manner. The digital camera 10 is connected to the mobile telephone 300 in a wireless manner.

Figure 2:
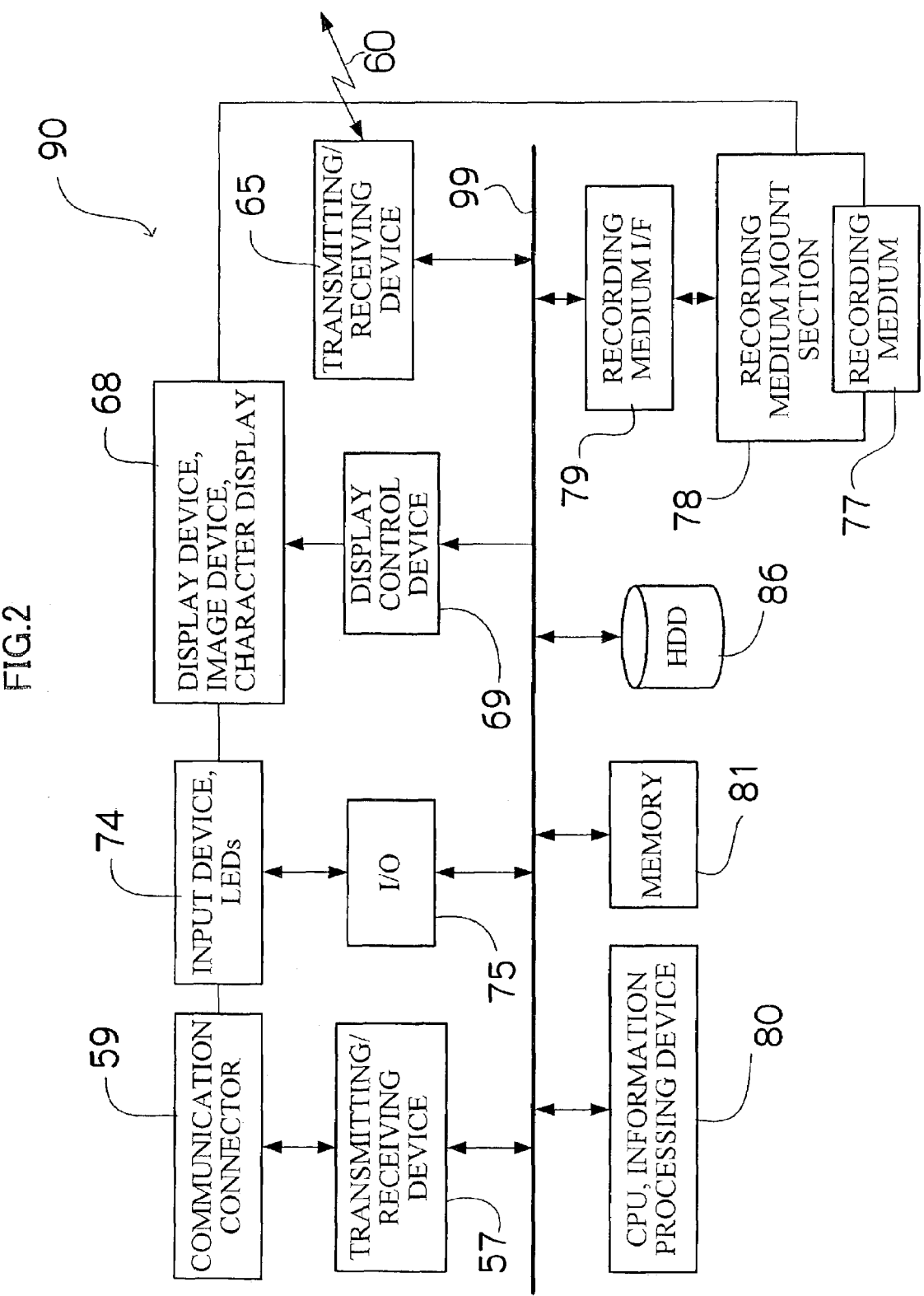
FIG. 2 is a block diagram for showing the configuration of the personal computer.

FIG. 2 is a block diagram for showing the configuration of the personal computer 90.

The information transmitting/receiving section of the personal computer 90 is provided with: a transmitting/receiving device 57 (including the functions of a transmitting device, a receiving device, an acquisition device, and an image acquisition device), which converts data into a predetermined form for transmitting/receiving information through wireless or wired communication; and a public circuit transmitting/receiving device 65, which transmits/receives information to/from other communication units through a public circuit 60 or other communication networks such as the Internet. The transmitting/receiving device 57 is connected to a communication connector 59, which can be connected to a USB or other interface.

The personal computer 90 is also provided with: a display device 68, which displays images, characters, and other information as required; a display control device 69, which provides a display image signal to the display device 68 in accordance with a command from a CPU 80; and an I/O 75, which reads various information provided by the user through an input device 74 and transfers it to the CPU 80 as described later and which issues a display command to an LED or other notification device in accordance with a command from the CPU 80.

The personal computer 90 is further provided with: a recording medium mount section 78, on which a recording medium 77 for recording a produced image is removably mounted; and a recording medium interface 79, which records image data or other information on the recording medium 77 and reads out such information from the recording medium 77. The recording medium 77 is a semiconductor medium such as memory cards, a magnetically and/or optically recordable medium represented by MO disks, or a removable recording medium represented by video tapes.

The personal computer 90 is further provided with: an information processing device or the CPU 80, which takes overall control on the personal computer 90; a memory 81, which comprises a ROM containing programs for operating the CPU 80 and various constants and a RAM serving as a working area used when the CPU 80 performs various processes; and a hard disk drive 86, which records various constants for the processes performed by the personal computer 90, attribute information used to connect to and communicate with a communication unit on the network, and connection information such as addresses. In the personal computer 90, the CPU 80 is connected to the peripheral circuits including the display control device 69, the I/O 75, the memory 81, and the hard disk drive 86 through a bus 99 to allow the CPU 80 to control the peripheral circuits.

Figure 3:
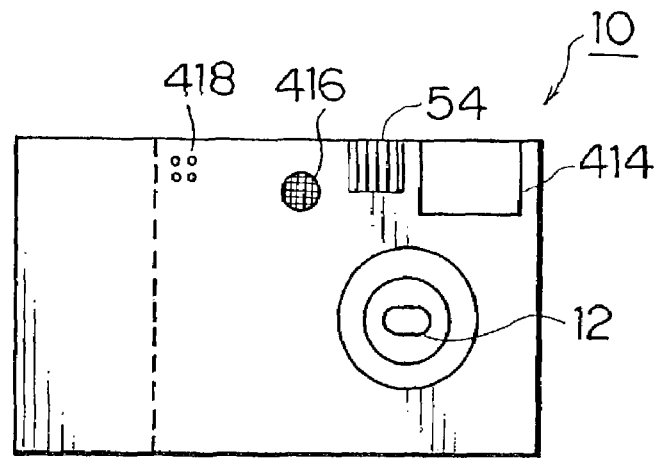
FIG. 3 is a front elevation for showing the appearance of a digital camera.
Figure 6:
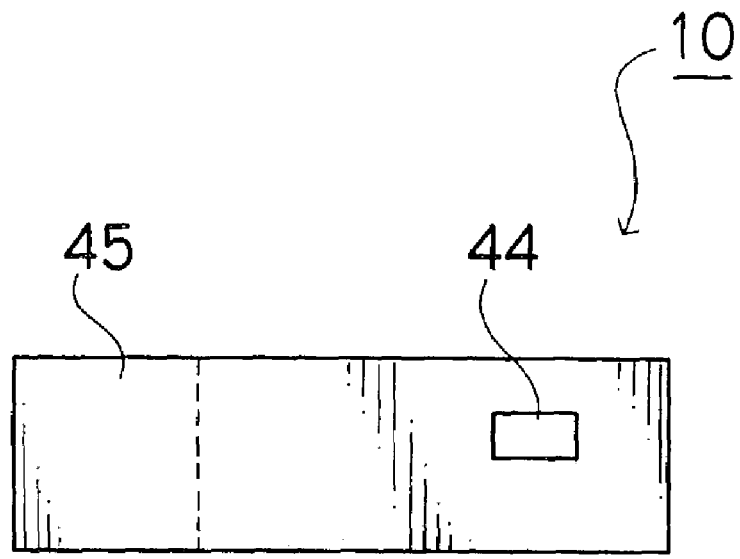
FIG. 6 is a bottom view of the digital camera.
Figure 7:
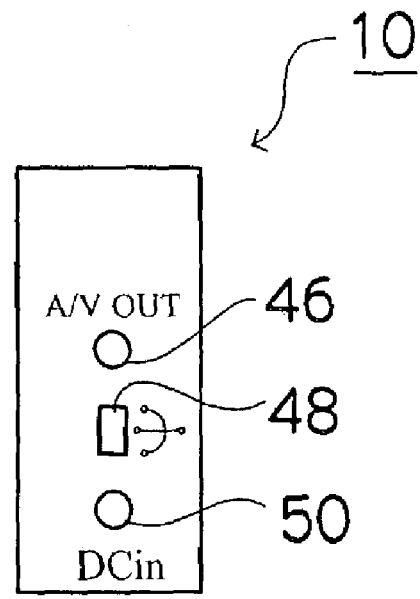
FIG. 7 is a right side elevation of the digital camera.

The digital camera 10 and the cradle 100 will be described below. FIG. 3 is a front elevation for showing the appearance of the digital camera 10, FIG. 4 is a back elevation of the digital camera 10, FIG. 5 is a plan view of the digital camera 10, FIG. 6 is a bottom view of the digital camera 10, and FIG. 7 is a right side elevation of the digital camera 10.

As shown in FIG. 3, the digital camera 10 is provided at the front thereof with a collapsible taking lens 12, a finder window 414, a short-distance wireless communication antenna 54, a self-timer LED 416, and a microphone 418. The digital camera 10 is further provided at the front thereof with a lens cover (not shown), which is opened/closed when the taking lens 12 is in the collapsed position.

Figure 4:
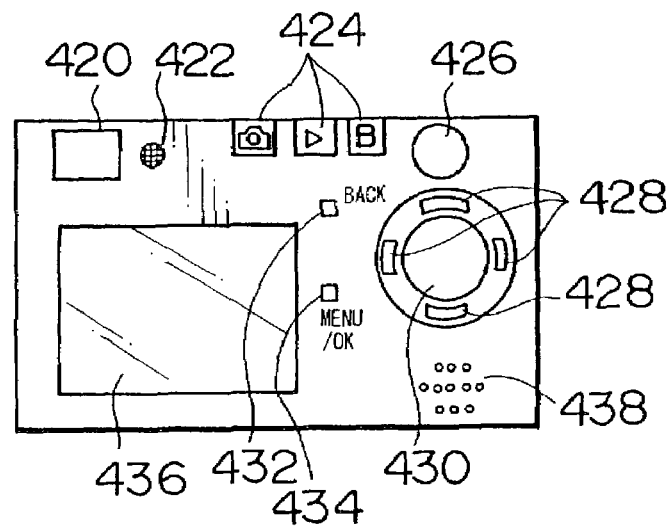
FIG. 4 is a back elevation of the digital camera.

As shown in FIG. 4, the digital camera 10 is provided at the back thereof with: a finder 420; a two-color (e.g., red and green) finder LED 422, which illuminates or blinks to indicate "power-on shooting standby," "electric flash unit charging," "USB data communication in progress" and other states; a shooting/reproducing/short-distance wireless communication mode selection switch 424; a shooting mode selection dial 426; a multifunctional cross-shaped key 428; a dot-matrix liquid crystal display 430, which indicates an operational mode of the digital camera 10 or a function of the cross-shaped key 428 with a character or icon; a backward switch 432; a menu/OK switch 434; a liquid crystal monitor 436 for displaying images; and a speaker 438.

Figure 5:
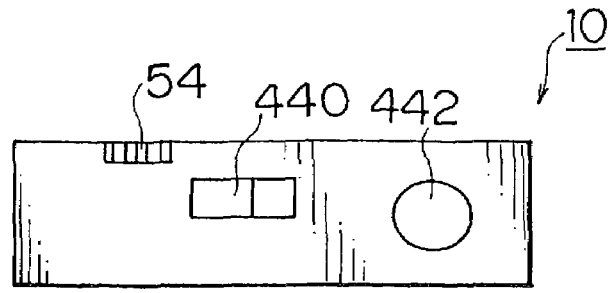
FIG. 5 is a plan view of the digital camera.

As shown in FIG. 5, the digital camera 10 is provided at the top thereof with an antenna 54, a power switch 440, and a shutter release button 442. As shown in FIG. 6, the digital camera 10 is provided at the bottom thereof with a camera connector 44, and a battery cover 45, which is used to open/close a battery container. As shown in FIG. 7, the digital camera 10 is provided at a side (the opposite side to a grip) thereof with an audio/video (A/V) output terminal 46, a digital (USB) terminal 48, and a DC input terminal 50.

The digital camera 10 allows the user to select from among shooting, reproducing, and short-distance wireless communication modes through the shooting/reproducing/short-distance wireless communication mode selection switch 424 and in the shooting mode, to select from among manual shooting, automatic shooting, motion picture, and voice recorder modes through the shooting mode selection dial 426. Specifically, the voice recorder mode is a mode of recording voice and/or sound only.

The liquid crystal monitor 436 can be used as an electronic viewfinder as well as to display taken picture images and reproduced images read out from the memory card mounted on the digital camera 10. The liquid crystal monitor 436 can also display number of recordable frames, reproduced frame numbers, with or without electric flashing, macro mode, recorded image quality, number of pixels, and other information as well as various menus, depending on the operation of the menu/OK switch 434 and/or the cross-shaped key 428.

Figure 8:
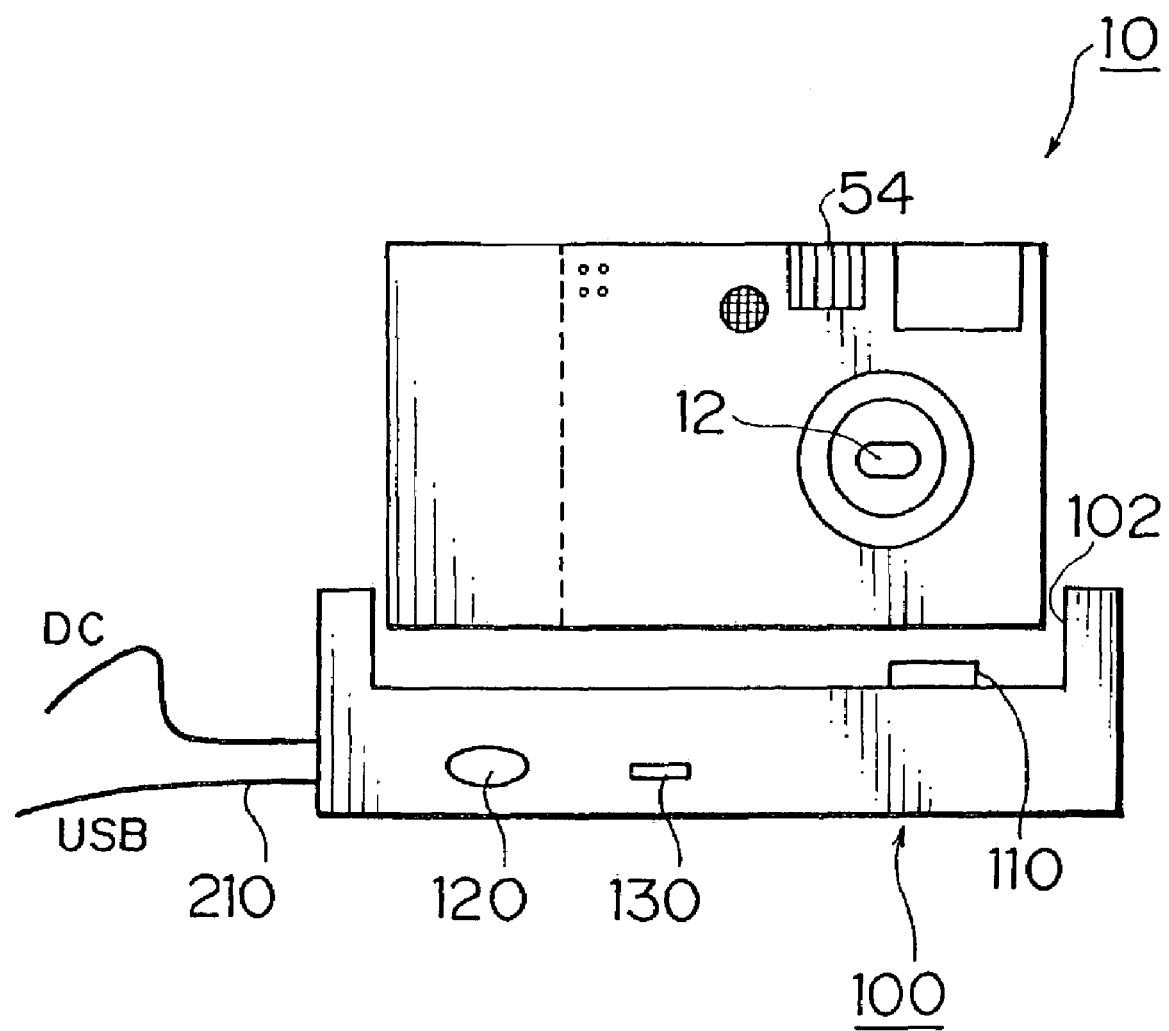
FIG. 8 is a front elevation of the digital camera and a cradle.

FIG. 8 is a front elevation of the digital camera 10 and the cradle 100. As shown in FIG. 8, the cradle 100 has a recess 102, which guides the digital camera 10 for mounting or removing the digital camera 10, and the recess 102 is provided at the bottom thereof with a cradle connector 110.

Figure 9:
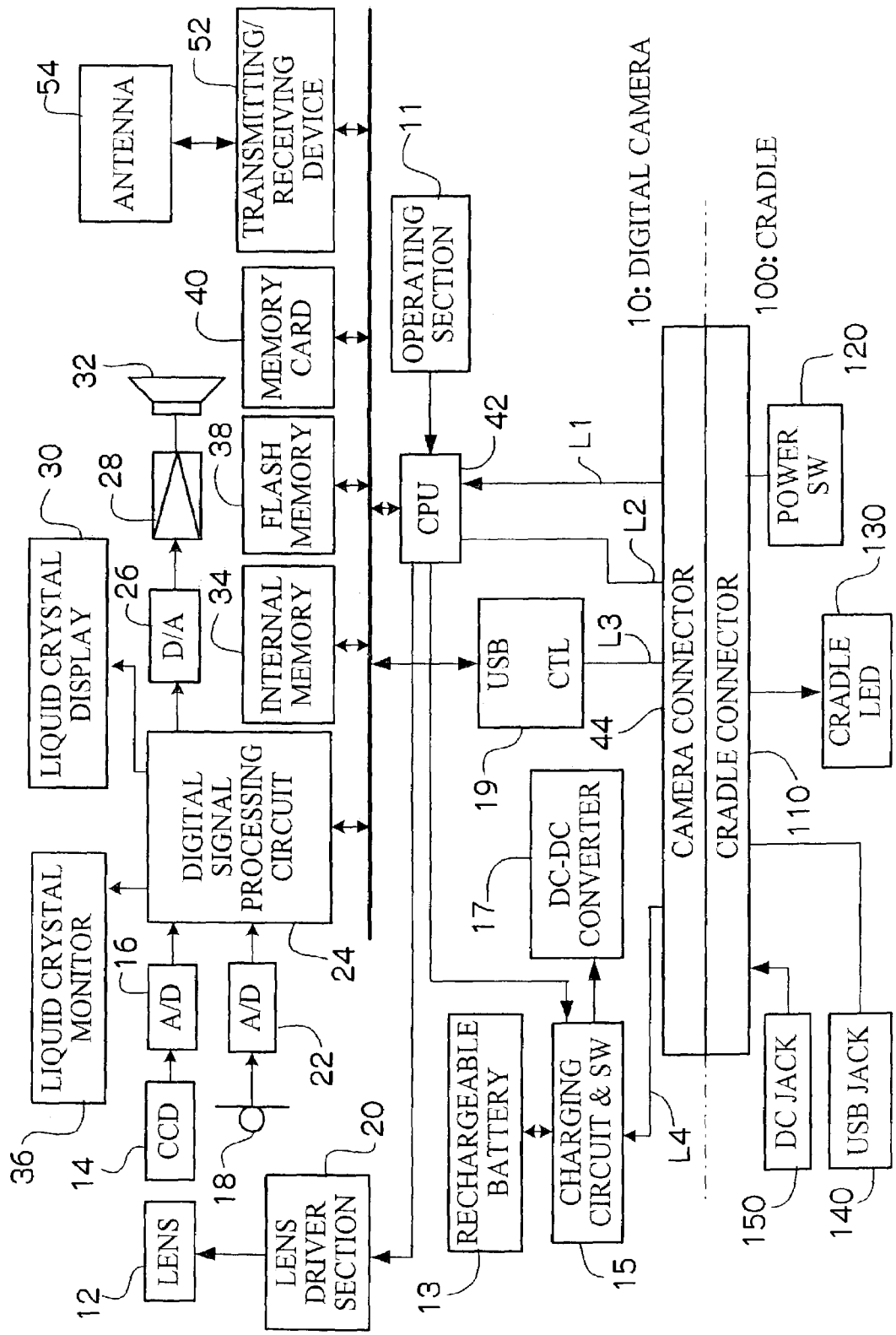
FIG. 9 is a block diagram for showing the internal configuration of the digital camera and the cradle.

The cradle 100 is provided at the front thereof with a power switch 120 and a cradle LED 130, and at the back thereof with a USB jack 140 for receiving a plug of a USB cable 210 and a DC jack 150 for receiving a plug of an AC adapter (see FIG. 9).

When the digital camera 10 is mounted into the recess 102 of the cradle 100, the camera connector 44 (see FIG. 6) provided on the bottom of the digital camera 10 is connected to the cradle connector 110 in response to the mounting operation.

FIG. 9 is a block diagram for showing the internal configuration of the digital camera 10 and the cradle 100. In FIG. 9, a central processing unit (CPU) 42 exercises centralized control over the circuits in the digital camera 10, in accordance with an input from an operating section 11 including the shooting/reproducing/short-distance wireless communication mode selection switch 424, the shooting mode selection dial 426, the cross-shaped key 428, the backward switch 432, the menu/OK switch 434, the power switch 440, and the shutter release button 442.

When the power switch 440 is operated, the CPU 42 detects it and turns on the power supply in the digital camera 10. When the shooting mode is selected through the shooting mode selection dial 426 and the digital camera 10 is not USB-connected to the personal computer 90, the CPU issues to a lens driver section 20 a command for opening the lens cover (not shown) and extending the taking lens 12 from the collapsed position to the shooting position to cause opening of the lens cover and extension of the taking lens 12 and thus to place the digital camera 10 in a shooting standby state.

When the shutter release button 442 is pressed with the digital camera 10 in the shooting standby state as described above, the CPU 42 detects it and causes the digital camera 10 to perform a still or motion picture shooting operation selected through the shooting mode selection dial 426 and to record the image data acquired during the shooting operation onto the memory card 40. More specifically, the CPU 42 causes the lens driver section 20 to perform focus and iris control operations and causes the taking lens 12 to focus the subject light on the receiving surface of a charge-coupled device (CCD) 14 for image forming.

The CCD 14 converts the subject light focused on the receiving surface thereof into an amount of signal charge corresponding to the luminous energy of the subject light. Thus accumulated signal charge is sequentially read out as a voltage signal corresponding to the signal charge. The voltage signal sequentially read out of the CCD 14 is applied to an A/D converter 16, which converts it into digital R, G, B signals, which are provided to a digital signal processing circuit 24.

The digital signal processing circuit 24 performs predetermined image processing operations such as a synchronizing process for simultaneously converting the dot sequential R, G, B signals applied by the A/D converter 16, white-balance calibration, gamma correction, and YC signal processing and then compresses a luminance signal Y and chroma signals Cr, Cb (YC signals) created by the YC signal processing into a predetermined format to record them onto the memory card 40.

During the motion picture shooting, sound waves are transformed by a microphone 18 into sound signal, which is converted into a digital signal by an A/D converter 22 to be applied to a digital signal processing circuit 24. The digital signal processing circuit 24 records the sound data together with the image data on the memory card 40. Unprocessed R, G, B raw data and YC signals are temporarily stored in an internal memory 34 and programs and constants used for camera control are stored in a flash memory 38.

When a reproducing mode is selected through the shooting mode selection dial 426 and the digital camera 10 is not USB-connected to the personal computer 90, compressed data of the last image file (the first frame if the file is a motion picture file) recorded on the memory card 40 is first read out and expanded by the digital signal processing circuit 24 into non-compressed YC signals and then converted into a color composite video signal to be provided to a liquid crystal monitor 36. This causes the liquid crystal monitor 36 to display a frame image of the last file recorded on the memory card 40. When a frame of a motion picture has been displayed on the liquid crystal monitor 36 and the operating section 11 is operated to begin reproducing the motion picture, the motion picture is reproduced on the liquid crystal monitor 36 with sound data provided to a speaker 32 through a D/A converter 26 and an amplifier 28, thereby reproducing the sound recorded together with the motion picture.

Forward or backward frame advance can be accomplished by operating left or right key positions of the cross-shaped key 428 and then an image file at an advanced frame location is read out of the memory card 40 so that a still or motion picture image can be reproduced on the liquid crystal monitor 36 in a similar manner to that described above.

When the short-distance wireless communication mode is selected through the shooting/reproducing/short-distance wireless communication mode selection switch 424, operational modes of the digital camera 10 vary depending on which case is applicable: (1) the digital camera 10 is mounted on the cradle 100 and USB-connected to the personal computer 90; and (2) the digital camera 10 is not mounted on the cradle 100 or not USB-connected to the personal computer 90. The operational modes for the Cases (1) and (2) will be described later in detail. The shooting/reproducing/short-distance wireless communication mode selection switch 424 can allow simultaneous selection of the shooting and short-distance wireless communication modes or of the reproducing and short-distance wireless communication modes. Of course, it can allow simple selection of the short-distance wireless communication mode.

Figure 10:
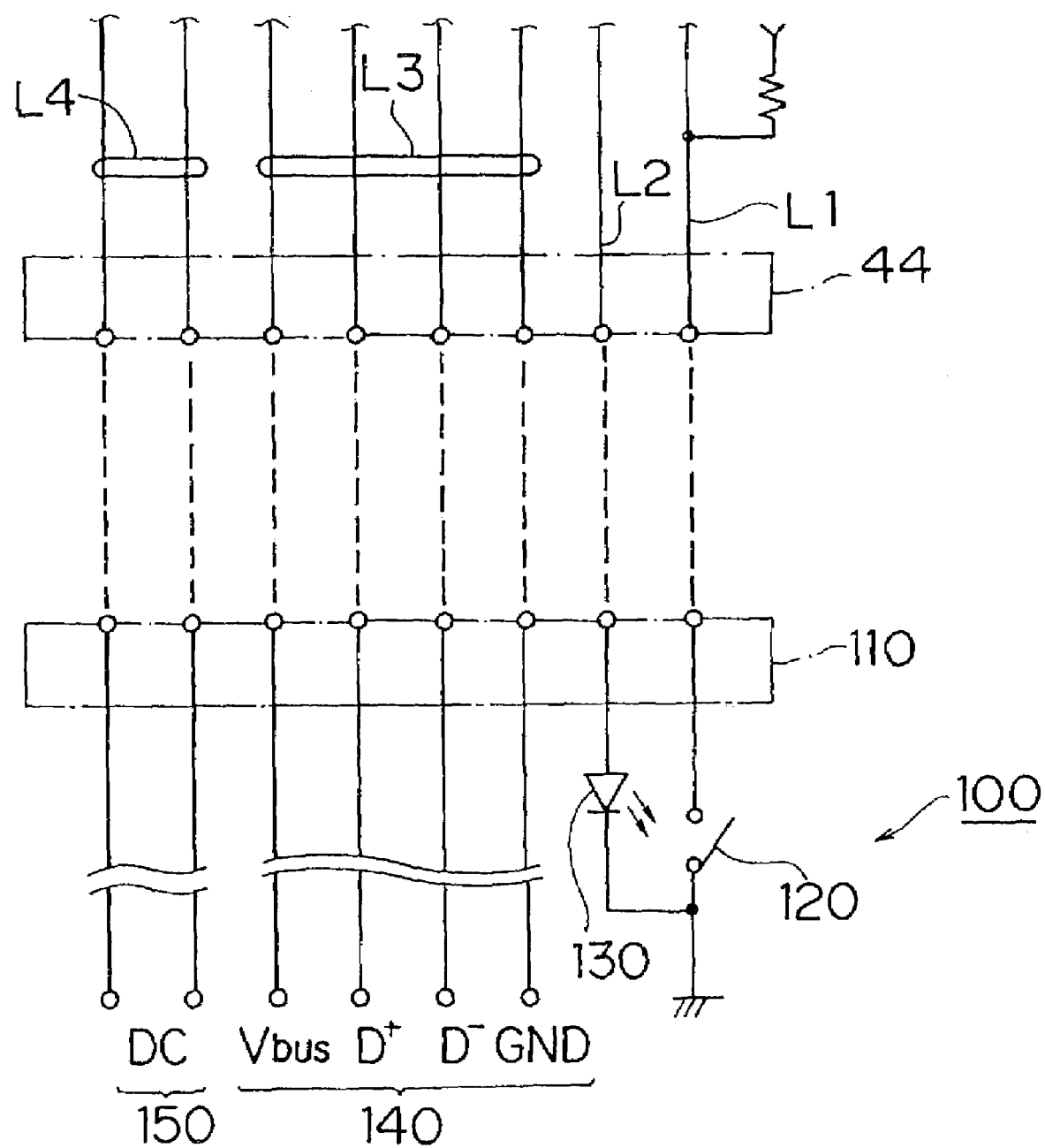
FIG. 10 shows connector sections of the digital camera and the cradle.

FIG. 10 shows connector sections of the digital camera 10 and the cradle 100. As described above, the cradle 100 is provided with the power switch 120, the cradle LED 130, the USB jack 140, and the DC jack 150, all of which are electrically connected to the cradle connector 110. More specifically, as shown in FIG. 10, the power switch 120, the cradle LED 130, the USB jack 140, and the DC jack 150 are connected to the respective terminals in the cradle connector 110 in a one-to-one relationship.

The camera connector 44 of the digital camera 10 is provided with terminals, each corresponding to a terminal of the cradle connector 110. When the digital camera 10 is mounted on the cradle 100, each terminal of the camera connector 44 is electrically connected to each corresponding terminal of the cradle connector 110.

Next, the operational modes of the digital camera 10 when mounted on the cradle 100 will be described below. The CPU 42 determines whether the digital camera 10 is mounted on the cradle 100 and then changes the operational mode of the digital camera 10 at its power-on depending on the determination.

<Case A, where the Digital Camera 10 is not Mounted on the Cradle 100>

When the digital camera 10 is not mounted on the cradle 100 and is powered on by means of the camera power switch 440, the digital camera 10 starts up depending on the mode selected through the shooting/reproducing/short-distance wireless communication mode selection switch 424 and/or the shooting mode selection dial 426. For example, when the automatic shooting mode is selected, the camera power-on causes opening of the lens cover and extension of the taking lens 12 and thus the digital camera 10 is placed in the shooting standby state. When the reproducing mode is selected, the camera power-on causes readout of image data from the memory card 40 and image reproduction on the liquid crystal monitor 36. When the short-distance wireless communication mode is selected, the camera power-on allows short-distance wireless communication.

<Case B, where the Digital Camera 10 is Mounted On the Cradle 100 with the Power Turned Off and then the Digital Camera 10 is Powered On by Means of the Power Switch of the Cradle 100>

When the digital camera 10 is mounted on the cradle 100 with the power turned off and then the power switch 120 of the cradle 100 is switched on, a line L1 which is pulled up as shown in FIG. 10 goes low. The CPU 42 detects this transition and turns on the digital camera 10. Another embodiment of the power switch of the cradle may be a switch for connecting/disconnecting the $V_{bus}$ line in the USB terminal. Namely, the CPU 42 may monitor the voltage on the $V_{bus}$ line in the USB terminal to turn on/off the digital camera 10.

When the digital camera 10 is powered on in the Case B, it starts up in the communication mode (USB mode). In addition, if the digital camera 10 is USB-connected, it automatically begins communication with the personal computer 90. The digital camera 10 can monitor whether the $D_+$ line in the USB terminal is pulled up or not to determine that it is USB-connected/disconnected. The digital camera 10 behaves as equipment of two different device classes, depending on the USB settings in the digital camera 10 itself when USB-connected. More specifically, the USB mode includes a USB mass storage class mode in which the digital camera 10 functions as a card reader and a USB camera mode in which the digital camera 10 functions as a PC camera, and the digital camera 10 has been previously set up to be in either mode. If the USB settings specify the digital camera to be a card reader, image data recorded on the memory card 40 is read out and transmitted as appropriate, and if the USB settings specify the digital camera to be a PC camera, it continuously transmits motion picture data while shooting, thereby allowing for videoconferencing.

<Case C, where the Digital Camera 10 is Powered On and then Mounted on the Cradle 100>

When mounted, the operational mode of the digital camera is determined in a similar manner to that for the Case B.

<Case D, where the Digital Camera 10 is Mounted on the Cradle 100 with the Power Turned On and the Digital Camera 10 is Not USB-Connected>

This may occur when the USB cable 210 comes off the cradle 100 or the personal computer 90 or when the personal computer 90 has been powered off. These conditions are displayed on the liquid crystal monitor 36 or the liquid crystal display 30 to alert the user.

In this embodiment, the power switch 440 of the digital camera 10 is provided on the top of the digital camera 10 as shown in FIG. 5 but it may be provided on its back. In the latter case, when the digital camera 10 is mounted on the cradle 100, the power switch 120 of the cradle 100 can be easier to operate than the power switch 440 of the digital camera 10 in turning on/off the digital camera 10.

Whether or not the digital camera 10 is mounted on the cradle 100 may be determined from an output of a cradle detecting switch (not shown) or from which switch is used for power-on, the power switch 440 of the digital camera 10 or the power switch 120 of the cradle.

The cradle LED 130 is connected to the CPU 42 through the cradle connector 110, the camera connector 44, and a line L2 and displays various camera states depending on a signal provided by the CPU 42. Specifically, the cradle LED 130 is controlled to illuminate/go out in response to power-on/power-off of the digital camera 10. The cradle LED 130 is also controlled to blink when the digital camera 10 and the personal computer 90 are operating through a USB-connection and to intermittently illuminate when the USB-connection between them can be removed. The liquid crystal display 30 displays an icon or character to indicate that they are operating through the USB-connection but the display operation of the liquid crystal display 30 may be stopped if the cradle LED 130 displays that condition.

The USB jack 140 is connected to a USB control 19 (see FIG. 9) through the cradle connector 110, the camera connector 44, and a line L3. As described above, when the CPU 42 recognizes the USB connection with the digital camera 10 powered on, it automatically changes the operational mode of the digital camera 10 to the USB mode and begins USB communication through the USB control 19.

The DC jack 150 is connected to a charging and switching circuit 15 through the cradle connector 110, the camera connector 44, and a line L4. Therefore, when DC power is supplied from the AC adapter to the DC jack 150, the DC power is supplied to the charging and switching circuit 15. When the charging and switching circuit 15 is supplied with the DC power with the digital camera 10 powered on, it begins charging a rechargeable battery 13, and when the rechargeable battery 13 becomes fully charged, the circuit stops charging.

The charging and switching circuit 15 is adapted to perform no charging operation when the digital camera 10 is powered on and to supply the DC power from a DC input terminal to a DC-DC converter 17 in response to a command from the CPU 42. The DC-DC converter 17 generates various voltages of power from the supplied DC power as required by the circuits in the digital camera 10 and supplies the generated voltages of power to the circuits in the digital camera 10.

In addition, the digital camera 10 may be adapted to determine whether it is supplied with the DC power through the cradle 100 and to permit the power switch 120 of the cradle to power on the digital camera 10 only if it determines that the DC power is supplied through the cradle 100. This may avoid the digital camera 10 being powered off due to an exhausted battery while it is communicating.

In this embodiment, the A/V output terminal 46 (see FIG. 7) is provided on the side of the digital camera 10 only, but an additional A/V output terminal may be provided on the camera connector 44. In this case, an A/V input terminal for connecting to the additional A/V output terminal and an A/V output jack for connecting to the A/V cable should be provided on the cradle connector 110.

It is needless to say that the digital camera 10 can operate in the same manner as described above even when the USB cable 210 and the AC adapter are plugged into the USB terminal 48 and the DC input terminal 50 on the side of the digital camera 10 shown in FIG. 7, respectively.

For the Cases A to D as described above, when the digital camera 10 is mounted on the cradle 100 and then powered on, the digital camera 10 starts up in the communication mode (USB mode) to automatically begin communication with the personal computer 90, and when the digital camera 10 is not mounted on the cradle 100, it starts up in the shooting/reproducing/short-distance wireless communication mode.

More specifically, when the short-distance wireless communication mode is selected through the shooting/reproducing/short-distance wireless communication mode selection switch 424, or when the digital camera 10 is powered on but no mode is selected through the shooting/reproducing/short-distance wireless communication mode selection switch 424, operational modes of the digital camera 10 vary depending on which case is applicable: (1) the digital camera 10 is mounted on the cradle 100 and USB-connected to the personal computer 90 (the Cases B and C); and (2) the digital camera 10 is not mounted on the cradle 100 (the Case A) or the digital camera 10 is not USB-connected to the personal computer 90 (the Case D).

<Case (1)>

In this case, a first mode in which communication can be established only between the personal computer 90 and the digital camera 10 through the USB cable 210 and a second mode in which communication can be established between the personal computer 90 and the mobile telephone 300 through the digital camera 10 may be possible. The first mode includes a file transmission mode and a shooting mode.

(First Mode)

"File Transmission Mode"

The personal computer 90 accesses the digital camera 10 through the USB cable 210 and the cradle 100. For this purpose, the personal computer 90 issues to the digital camera 10 a command for acquiring the communication ID of the digital camera 10 and then acquires the communication ID from the digital camera 10. If the acquired communication ID has been registered with the personal computer 90, the personal computer 90 issues to the digital camera 10 an image transmission command to order it to transmit an image file in the memory card 40 mounted on the digital camera 10. The digital camera 10 transmits the image file in the memory card 40 to the personal computer 90. The personal computer 90 receives the transmitted image file and temporarily stores it in the memory 81 for displaying it on the display device 68.

"Shooting Mode"

The personal computer 90 accesses the digital camera 10 through the USB cable 210 and the cradle 100. For this purpose, the personal computer 90 issues to the digital camera 10 a command for acquiring the communication ID of the digital camera 10 and then acquires the communication ID from the digital camera 10. If the acquired communication ID has been registered with the personal computer 90, the personal computer 90 issues to the digital camera 10 a command for activating the shooting function of the digital camera 10. In response to the shooting function activating command, the digital camera 10 shoots images (motion or still picture images) and transmits them to the personal computer 90 at regular intervals. These intervals depend on an application stored in the personal computer 90. The personal computer 90 receives the transmitted image data and temporarily stores it in the memory 81 for displaying it on the display device 68 and then records it in the hard disk drive 86 and the recording medium 77, if required.

(Second Mode)

The second mode is a dongle mode.

"Dongle Mode"

The personal computer 90 accesses the digital camera 10 through the USB cable 210 and the cradle 100 and activates the transmitting/receiving device 52 of the digital camera 10 to allow it to establish short-distance wireless communication through the digital camera 10. If the mobile telephone 300 is situated within a range for short-distance wireless communication from the digital camera 10 and it has been powered on, the personal computer 90 recognizes the mobile telephone 300 as a communication partner. The mobile telephone 300 can read out images, sounds, personal information, and other data from the personal computer 90. The mobile telephone 300 can also transmit images, sounds, personal information, and other data to the personal computer 90. These communications between the personal computer 90 and the mobile telephone 300 are intervened by the digital camera 10. More specifically, the transmitting/receiving device 52 and the antenna 54 form a communication interface to the mobile telephone 300 and the camera connector 44, the cradle connector 110, and the USB jack 140 form a communication interface to the personal computer 90. This can allow the personal computer 90 and the mobile telephone 300 to communicate with each other.

In the dongle mode, at least the shooting function and the image processing function of the digital camera 10 may be disabled.

In addition, selection among from the file transmission, shooting, and dongle modes may be previously accomplished by application software.

<Case (2)>

In the Case (2), the digital camera 10 is not mounted on the cradle 100 (the Case A) or the cradle 100 is not USB-connected (the Case D). In this case, as described above, the user of the digital camera 10 receives an alert indication through the liquid crystal monitor 36, but no transmission path between the digital camera 10 and the personal computer 90 is formed and only a transmission path between the digital camera 10 and the mobile telephone 300 can be formed if predetermined conditions are met. When the short-distance wireless communication mode is selected through the shooting/reproducing/short-distance wireless communication mode selection switch 424 in the digital camera 10 or when the digital camera 10 is powered on but no mode is selected through the switch 424, the mobile telephone 300 which is situated within a range for short-distance wireless communication from the digital camera 10 and has been powered on, recognizes the digital camera 10 as a communication partner. The mobile telephone 300 can read out images, sounds, and other data from the digital camera 10. The mobile telephone 300 can also transmit images, sounds, and other data to the digital camera 10. Also for such short-distance wireless communication with the mobile telephone 300, the digital camera 10 uses the transmitting/receiving device 52 and the antenna 54 as a communication interface to the mobile telephone 300.

When the digital camera 10 establishes short-distance wireless communication with the mobile telephone 300, it is advantageous that the antenna 54 with a high sensitivity is provided on the top of the digital camera 10 so that it may never obstruct connector connection for mounting the digital camera 10 on the cradle 100, and when the mobile telephone 300 communicates with the personal computer 90, it is advantageous that the digital camera 10 provided with the intervening antenna protrudes from the personal computer 90 so that a high antenna sensitivity and communication quality can be achieved.

In this embodiment, the host unit is implemented by the personal computer 90 but possible host units may include a television set, a set-top box, and a deck.

In addition, the terminal unit is implemented by the mobile telephone 300 but it may be a PDA having the short-distance wireless communication function, etc.

The short-distance wireless communication function may be accomplished, by way of example, by using a Bluetooth, wireless LAN, W-CDMA, or infrared technique.

The transmission path between the host unit and the digital camera 10 is implemented by the USB cable in this embodiment but it may be any device compatible with IEEE 1394 or other suitable standards.

While the digital camera 10 is mounted on the cradle 100, it is supplied with electric power from the AC adapter to the DC jack 150 in the first and second modes.

Communication between the digital camera 10 and the terminal unit can be accomplished not only in a wireless manner but also in a wired manner.

It is needless to say that images and other data transmitted from the digital camera 10 or the mobile telephone 300 to the host unit can be also transmitted to external devices through Internet or other networks.

According to the present invention, data transmission to/from the host unit can be accomplished while charging the digital camera, and in addition, since the digital camera also serves as a wireless communication adapter, the host unit can communicate with any terminal unit other than the camera in a wireless manner, resulting in a remarkably improved convenience.

In the above-described embodiments, the imaging apparatus is implemented by the digital camera but any imaging apparatus other than digital cameras may be applicable.

According to the present invention, the imaging apparatus and the support apparatus can form a communication transmission path for the host communication unit or act as an intervening transmitter-receiver terminal between the host communication unit and the communication terminal. Therefore, it is convenient that another communication transmission path can be formed while the imaging apparatus is connecting to the host communication unit for communication. In addition, the imaging apparatus can communicate with the host communication unit while being supplied with electric power.

According to the present invention, the host communication unit can confirm the ID of an imaging apparatus intended to be a communication partner before transmitting/receiving image and other data to/from the imaging apparatus as well as to/from another communication terminal through the imaging apparatus.

According to the present invention, it is advantageous that in addition to a wired transmission path established from the imaging apparatus to the host communication unit, a wireless communication transmission path to the communication terminal can be formed.

According to the present invention, a good transmission path can be established for wireless communication.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An imaging communication system which is adapted to communicate with a communication terminal and a host communication unit, the system comprising:
    an imaging apparatus including an imaging device, an image processing device, a memory device, and a first communication device which allows communication with the communication terminal; and
    a support apparatus which is capable of being connected to a power supply to provide electric power from the connected power supply for the imaging apparatus and which includes a second communication device for the host communication unit connected to the imaging apparatus through a signal line to allow communication between the imaging apparatus and the host communication unit,
    wherein the imaging communication system is capable of selectively operating in each of the following modes:
    a first mode in which the imaging apparatus is capable of communicating with the host communication unit through the support apparatus; and
    a second mode in which the imaging apparatus is capable of acting as a communication intervening unit between the communication terminal and the host communication unit through the first communication device and the support apparatus.

2. The imaging communication system as defined in claim 1, wherein:
    when the first mode is selected, the imaging apparatus is capable of transmitting a communication ID of the imaging apparatus and contents recorded on a memory medium connected to the imaging apparatus, to the host communication unit; and
    when the second mode is selected, the imaging apparatus and the support apparatus relay data transmitted between the first communication device and the communication terminal and data transmitted between the second communication device and the host communication unit.

3. The imaging communication system as defined in claim 1, wherein when the second mode is selected, a transmission path formed between the first communication device and the communication terminal is wireless, and a transmission path formed between the second communication device and the host communication unit is wired.

4. The imaging communication system as defined in claim 3, wherein the imaging apparatus comprises:
    a connecting terminal for connecting to the support apparatus through a signal line; and
    an antenna element for communicating with the communication terminal, the antenna element being arranged on a face different from a face on which the connecting terminal is arranged.

5. The imaging communication system as defined in claim 3, wherein said wireless transmission path formed between the first communication device and the communication terminal includes a short-distance wireless transmission path.

6. The imaging communication system as defined in claim 5, wherein said short-distance wireless transmission path includes at least one of a Bluetooth wireless transmission path, a wireless LAN transmission path, a W-CDMA wireless transmission path, and an infrared wireless transmission path.

7. The imaging communication system as defined in claim 1, wherein, when the first mode is selected, the imaging apparatus is capable of transmitting a communication ID of the imaging apparatus and contents recorded on a memory medium connected to the imaging apparatus, to the host communication unit.

8. The imaging communication system as defined in claim 1, wherein, when the second mode is selected, the imaging apparatus and the support apparatus relay data transmitted between the first communication device and the communication terminal and data transmitted between the second communication device and the host communication unit.

9. The imaging communication system as defined in claim 1, wherein said first communication device of said imaging apparatus receives data from said communication terminal, and transmits said data, which is received from said communication terminal, to said host communication unit.

10. The imaging communication system as defined in claim 1, wherein the support apparatus comprises:
- a cradle for supporting the imaging apparatus,
- wherein said cradle charges a battery of said imaging apparatus.

11. The imaging communication system as defined in claim 1, wherein said communication terminal comprises at least one of a mobile telephone and a personal data assistant (PDA).

12. The imaging communication system as defined in claim 1, wherein said host communication unit comprises at least one of a personal computer, a television set, a set-top box, and a deck.

13. The imaging communication system as defined in claim 1, wherein said imaging apparatus comprises a digital camera.

14. An imaging communication system which is adapted to communicate with a communication terminal and a host communication unit, the system comprising:
- an imaging apparatus including an imaging device, an image processing device, a memory device, and a first communication means for communicating with the communication terminal; and
- a support apparatus which includes second communication means for communication between the imaging apparatus and the host communication unit,
- wherein the imaging communication system is capable of selectively operating in each of the following modes:
- a first mode in which the imaging apparatus is capable of communicating with the host communication unit through the second communication means of the support apparatus; and
- a second mode in which the imaging apparatus is capable of acting as a communication intervening unit between the communication terminal and the host communication unit through the first communication means and the support apparatus.

15. The imaging communication system as defined in claim 14, wherein said support apparatus includes means for providing electric power to the imaging apparatus.

16. The imaging communication system as defined in claim 14, wherein, when the first mode is selected, the imaging apparatus is capable of transmitting a communication ID of the imaging apparatus and contents recorded on a memory medium connected to the imaging apparatus, to the host communication unit.

17. The imaging communication system as defined in claim 14, wherein, when the second mode is selected, the imaging apparatus and the support apparatus relay data transmitted between the first communication means and the communication terminal, and data transmitted between the second communication means and the host communication unit.

18. The imaging communication system as defined in claim 14, wherein, when the second mode is selected, a transmission path formed between the first communication means and the communication terminal includes a wireless transmission path, and a transmission path formed between the second communication means and the host communication unit includes a wired transmission path.

19. The imaging communication system as defined in claim 18, wherein the imaging apparatus comprises:
- a connecting terminal for connecting to the support apparatus through a signal line; and
- antenna means for communicating with the communication terminal, the antenna means being arranged on a face of said imaging apparatus which is different from a face of said imaging apparatus which includes the connecting terminal.

20. The imaging communication system as defined in claim 18, wherein said wireless transmission path formed between the first communication means and the communication terminal includes a short-distance wireless transmission path.

21. The imaging communication system as defined in claim 20, wherein said short-distance wireless transmission path includes at least one of a Bluetooth wireless transmission path, a wireless LAN transmission path, a W-CDMA wireless transmission path, and an infrared wireless transmission path.

22. The imaging communication system as defined in claim 14, wherein the support apparatus comprises:
- a cradle for supporting the imaging apparatus,
- wherein the cradle is connected to the imaging apparatus through signal line, and
- wherein said cradle charges a battery of said imaging apparatus.

23. An imaging communication system which is adapted to communicate with a communication terminal and a host communication unit, the system comprising:
- imaging means for communicating with the communication terminal; and
- support means for supporting the imaging means and providing electric power from a connected power supply to the imaging means,
- wherein said support means includes communication means for the host communication unit connected to the imaging means through signal line means to allow communication between the imaging means and the host communication unit,
- wherein the imaging communication system is capable of selectively operating in each of the following modes:
- a first mode in which the imaging means communicates with the host communication unit through the support means; and
- a second mode in which the imaging means acts as intervening communication means between the communication terminal and the host communication unit through the support means.

* * * * *